Nov. 22, 1949  G. L. TIERCE  2,488,838
DUCK CALL
Filed Jan. 13, 1949
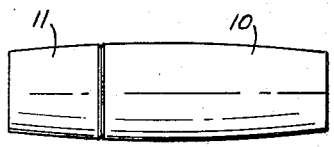
Fig 1
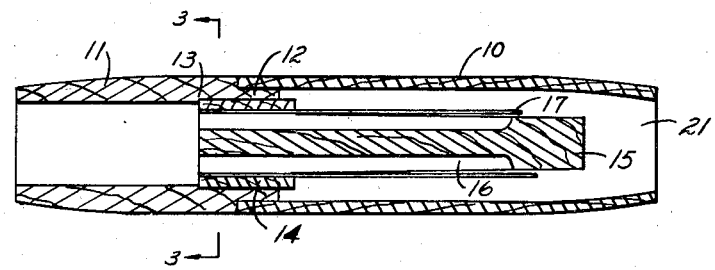
Fig 2
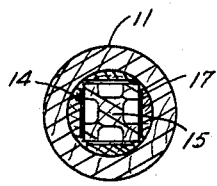
Fig 3
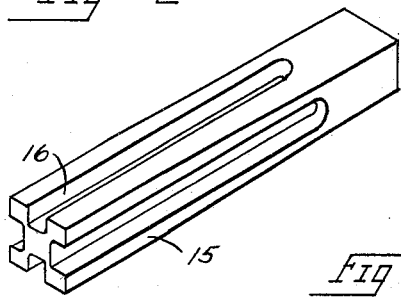
Fig 4
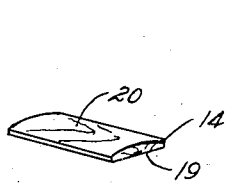
Fig 5
Fig 6
INVENTOR.
Gilbert L. Tierce Patented Nov. 22, 1949

2,488,838

UNITED STATES PATENT OFFICE 2,488,838

DUCK CALL

Gilbert L. Tierce, Shreveport, La.

Application January 13, 1949, Serial No. 70,719

3 Claims. (Cl. 46—180)

My invention relates to duck calls and has for its main object the provision of an instrument which, when blown, will simulate the call of a group of ducks and emitting the sounds in various frequencies simultaneously.

Another object of the invention is to provide a duck call wherein the pitch of each of the sounds produced thereby may be varied at the will of the operator to facilitate the imitation of ducks while feeding, mating, or any of the calls an operator might believe attractive to ducks.

Another object of the invention is to provide a duck call that is easy to manufacture and operate, that contains a minimum number of component parts and which can be mastered by a novice to simulate the sound of ducks.

My invention consists briefly in a two-piece housing, one end of which might be considered as the mouthpiece and the other end a sound box. Arranged within a common bore is a multiplicity of adjustable reeds responding to air blown through the mouthpiece and vibrating at pitches of any desired frequency.

A clearer understanding of the invention will be had by reference to the following detailed description and accompanying drawing in which:

Fig. 1 is a side view of an embodiment of my invention in a duck call.

Fig. 2 is an enlarged, longitudinal, sectional view.

Fig. 3 is a cross sectional view taken along lines 3—3 of Fig. 2.

Fig. 4 is an isometric view of a reed mandrel used in the invention.

Fig. 5 is an isometric view of a reed for the mandrel and

Fig. 6 is an isometric view of a wedge block used in positioning the mandrel.

In Fig. 1 the duck call is shown as being cigar-shaped on its exterior, the forward end of the mouthpiece 10 and the rear end of the sound box 11 being tapered in tear-drop fashion.

In Fig. 2 the sound box 11 is shown with its inner end 12 turned to a smaller diameter which slidably receives the inner bore of the mouthpiece 10. The inner end of the sound box 11 is provided with a counterbore which forms a shoulder 13 which acts as a depth stop for the reed positioning blocks 14.

The reed mandrel 15 is square-shaped in construction as shown in Fig. 4 with grooves 16 cut on each face thereof. It will be noted that the inner end of the mandrel 15 is substantially square and extends for a length approximating the length of the reed positioning blocks 14, from which point each face thereof is tapered with the smaller end terminating just short of the opening at the extremity of the mouthpiece 10.

The reeds 17 in this instance, are made of hard rubber, relatively thin, and slightly less in width than the width of the reed mandrel 15. While not absolutely necessary, actual tests have shown that the reed 17 should be perfectly flat with all sharp corners removed and with the forward or vibrating end 18 rounded as shown.

The reed positioning blocks 14 are 4 in number with a flat bottom surface 19 and a curved top portion 20. The curved top portion 20 of the reed positioning blocks are of such a radius as to correspond to the radius of the inner counterbore of the sound box 11 so that when the mandrel assembly is put into operative position in the sound box 11, it will fit snugly without the use of threaded members or set screws.

In assembling the device, the reeds are placed over the air grooves 16 on the reed mandrel 15 and a reed positioning block 14 is placed over each reed. This assembly is placed into the counterbored end of the sound box 11 and the reeds are ready for adjustment. This adjustment is made by positioning the forward ends 18 of the reeds 17 at varying distances from the nearest end of its positioning block 14. It will be remembered that the forward end 18 of each reed 17 must extend slightly beyond the end of its corresponding air groove 16.

When air is blown through the mouthpiece opening 21 it is forced into the open space between the reeds 17 and the top surface of the mandrel 15, where it enters the air grooves and is exhausted through the sound box 11. Air, thus blown, will cause the reeds to vibrate against the mandrel to simulate the sound of ducks. Each reed may be "tuned" separately so that the frequency of each is different enough from the other so that when all are sounded simultaneously the result will be an imitation of a group of ducks rather than the prior art type which produces only a single sound imitation.

After the reeds have been set to the desired frequencies by the operator, the mouthpiece is left in its mounting position as shown in Fig. 2 and the device is ready for use.

For best results in the construction of a device according to the teachings of the invention, all parts except the reeds are made of wood. Preference is given to light mahogany for the mouthpiece and sound box 10 and red cedar for the reed mandrel 15 and the reed positioning blocks 14. It has been found that these woods finish well, have good resonant qualities and are able to withstand dampness and rain which usually accompanies duck seasons.

While I have described my invention in detail in the particular embodiment shown in the drawings, it is to be understood that this has been by way of example only, and that various changes in the number of reeds might be made or the mandrel changed to a round structure. Other modifications might be made without departing from the spirit and scope of the invention as defined by the following claims.

I claim:

1. A duck call comprising a hollow body member, a multi-faced mandrel mounted within said body member, means for mounting a reed on each face of said multi-faced mandrel in a manner to permit a portion of its length to vibrate against said mandrel to simulate the sound of a plurality of ducks when air is blown through said hollow body member consisting in a plurality of wedge blocks adapted to wedge an end portion of each of said reeds against a face of said multi-faced mandrel and the inner wall surface of said hollow body member and means for adjusting the vibrating frequency of each reed with respect to the other.

2. A duck call comprising a tubular, two piece body member consisting in a sound box and a mouthpiece, a four sided mandrel adapted for mounting in said sound box, said mandrel being extended uniformly square-shaped for a portion of its length with each face thereof tapered downwardly toward the longitudinal axis for the remaining portion thereof, each face of said mandrel provided with a groove, a reed for each face of said mandrel adapted to be positioned over the groove cut thereon, a wedge block for each reed, each of said wedge blocks having a flat bottom and an oval-shaped top, said wedge blocks adapted to be positioned over the end portions of said reeds to wedge the same against mandrel and the inner wall surface of said sound box, means for limiting the depth said wedge blocks may enter said sound box, and means for varying the pitch of said reeds to simulate the sound of multiplicity of ducks when air is blown through said mouthpiece.

3. A duck call comprising a tubular sound box having a counterbore in one end, a tubular mouthpiece adapted for mounting on said sound box in a manner to provide a common bore through the same and said sound box, a multi-faced mandrel adapted for mounting in said sound box, a plurality of reeds for said mandrel, a plurality of wedge blocks, each of said wedge blocks adapted to be positioned over one of said reeds to wedge the same against one of the faces of said mandrel and the inside wall surface of said counterbore, a groove formed upon a portion of each face of said mandrel to permit air to be exhausted through said sound box and means for adjusting said reeds in variable, relative distances from said wedge blocks to permit said reeds to vibrate simultaneously at varied frequencies when air is blown through said mouthpiece.

GILBERT L. TIERCE.

REFERENCES CITED

The following references are of record in the file of this patent:

UNITED STATES PATENTS

| Number | Name | Date |
| --- | --- | --- |
| 795,492 | Ditto | July 25, 1905 |
| 2,344,402 | Frady | Mar. 14, 1944 |
| 2,396,359 | Yager | Mar. 12, 1946 |